US007230346B2

(12) United States Patent
Mahowald

(10) Patent No.: US 7,230,346 B2
(45) Date of Patent: Jun. 12, 2007

(54) POWER SOURCE FOR SENSORS

(75) Inventor: Peter H. Mahowald, Los Altos, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/488,332

(22) Filed: Jul. 18, 2006

(65) Prior Publication Data

US 2007/0001463 A1 Jan. 4, 2007

Related U.S. Application Data

(62) Division of application No. 10/896,253, filed on Jul. 21, 2004, now Pat. No. 7,112,892.

(51) Int. Cl.
*F03B 13/00* (2006.01)
*H02P 9/04* (2006.01)

(52) U.S. Cl. .......................................... 290/43; 290/54

(58) Field of Classification Search .................. 290/43, 290/54, 1 R; 60/608
See application file for complete search history.

(56) References Cited

U.S. PATENT DOCUMENTS

| | | | | |
|---|---|---|---|---|
| 3,750,001 | A * | 7/1973 | McCloskey | 322/35 |
| 4,510,397 | A * | 4/1985 | Schroeder, Jr. | 290/43 |
| 4,511,806 | A * | 4/1985 | May | 290/43 |
| 6,036,333 | A * | 3/2000 | Spiller | 362/192 |
| 6,798,080 | B1 * | 9/2004 | Baarman et al. | 290/43 |
| 2001/0035952 | A1 * | 11/2001 | Merklein | 356/239.2 |
| 2003/0097482 | A1 * | 5/2003 | DeHart et al. | 709/253 |
| 2005/0248161 | A1 * | 11/2005 | Heidel | 290/54 |

FOREIGN PATENT DOCUMENTS

JP 406074925 A * 3/1994

* cited by examiner

*Primary Examiner*—Julio Gonzalez

(57) ABSTRACT

A sensor is placed in wireless communication with a monitoring system. Power for the sensor is generated by scavenging power from fluid flow within a pipe.

20 Claims, 5 Drawing Sheets

POWER SOURCE FOR SENSORS

This is a Divisional of application Ser. No. 10/896,253 filed Jul. 21, 2004 now U.S. Pat. No. 7,112,892, the entire disclosure of which is incorporated herein by reference.

BACKGROUND

There is an increasing recognition of the usefulness of sensors to monitor the condition of property and the operation of appliances. Typically, power outlets or batteries are used to provide power for sensors. In some instances, where sunlight is available, solar power may be also utilized.

However, each of the above listed sources of power has limitations. For example, for some sensors, no direct pathway to sunlight is available. The wiring required to connect a sensor to a power outlet may be expensive to install. Batteries often discharge after a period of time and need to be replaced. This can present a difficulty when the sensor is not readily accessible. Even when the sensor is accessible, it is often difficult to detect when a battery is discharged. The necessary monitoring of the condition of the battery can be inconvenient and therefore neglected.

It is desirable, therefore, to explore other potential power sources for sensors.

SUMMARY OF THE INVENTION

In accordance with embodiments of the present invention, a sensor is placed in wireless communication with a monitoring system. Power for the sensor is generated by scavenging power from fluid flow within a pipe.

DESCRIPTION OF THE EMBODIMENT

Figure 1:
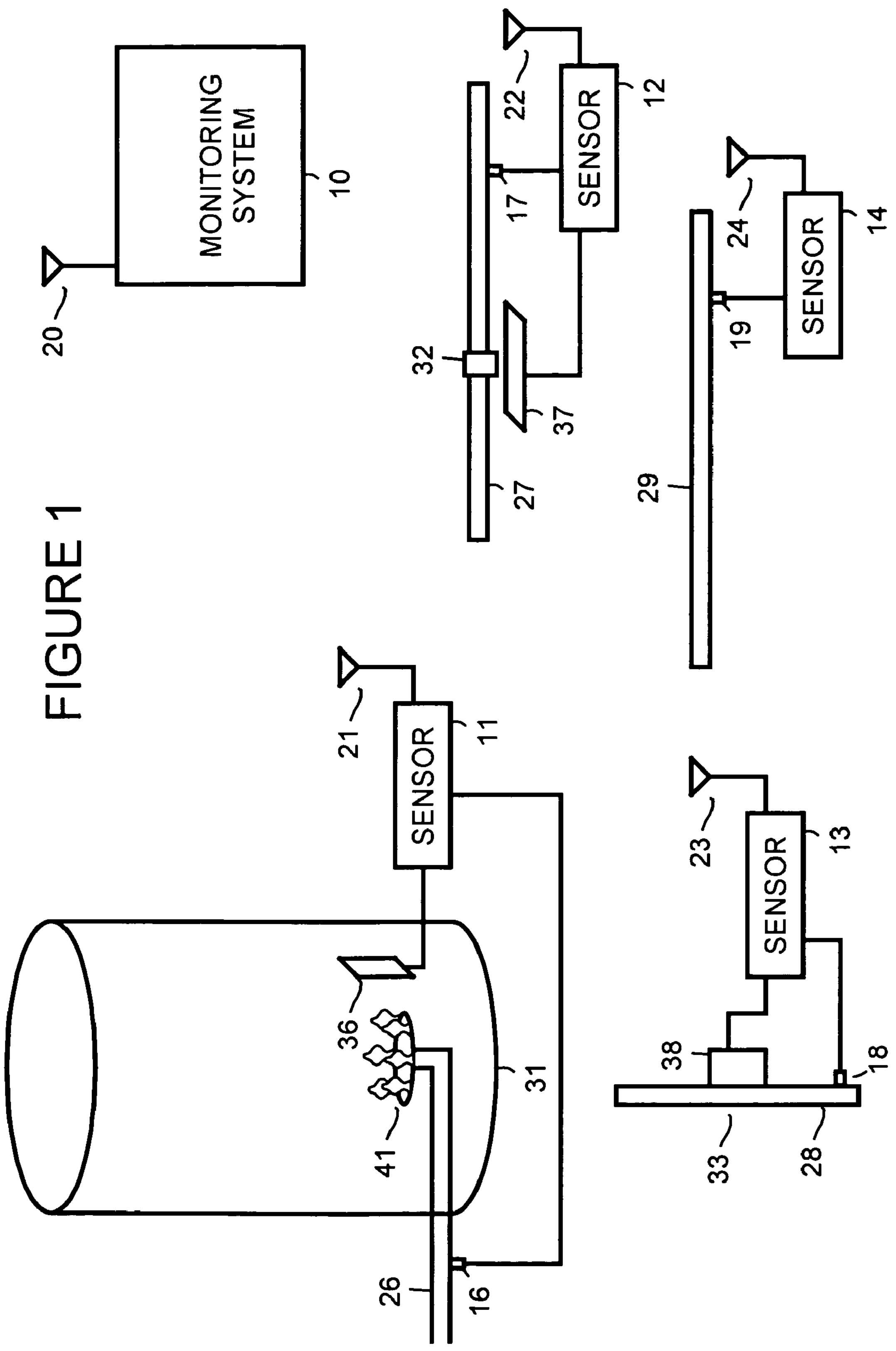
FIG. 1 is a simplified block diagram showing a monitoring system in communication with various sensors powered by scavenging power from fluid flow within pipes in accordance with an embodiment of the present invention.

FIG. 1 is a simplified block diagram showing a monitoring system 10 in wireless communication with a sensor 11, a sensor 12, a sensor 13 and a sensor 14. For example, sensor 11 transmits wireless transmissions, via an antenna 21, that are received by an antenna 20 of monitoring system 10. Sensor 12 transmits wireless transmissions, via an antenna 22, that are received by antenna 20 of monitoring system 10. Sensor 13 transmits wireless transmissions, via an antenna 23, that are received by antenna 20 of monitoring system 10. Sensor 14 transmits wireless transmissions, via an antenna 24, that are received by antenna 20 of monitoring system 10.

Sensor 11 uses an imager 36 to monitor a flame 41 within an appliance 31. For example, appliance 31 is a furnace, water heater, dryer or some other appliance that uses a gas to produce a flame. Sensor 11 scavenges power from fluid flow within a pipe 26 used to supply gas for flame 41. Power is scavenged through use of a generator 16.

Sensor 12 uses a moisture detector 37 to monitor integrity of a joint 32 within a pipe 27. For example, pipe 27 is a water pipe used in a home or business. Sensor 12 scavenges power from fluid flow within pipe 27. Power is scavenged through use of a generator 17.

Sensor 13 uses a thermometer 38 to monitor heat within a pipe 28. For example, pipe 28 carries water from a water heater. Sensor 13 scavenges power from fluid flow within pipe 28. Power is scavenged through use of a generator 18.

Sensor 14 monitors fluid flow within a pipe 29. For example, pipe 29 carries a liquid such as water or a gas such as natural gas. Sensor 13 scavenges power from fluid flow within pipe 29. Power is scavenged through use of a generator 19. The amount of power generated by generator 19 indicates fluid flow rate within pipe 29.

Figure 2:
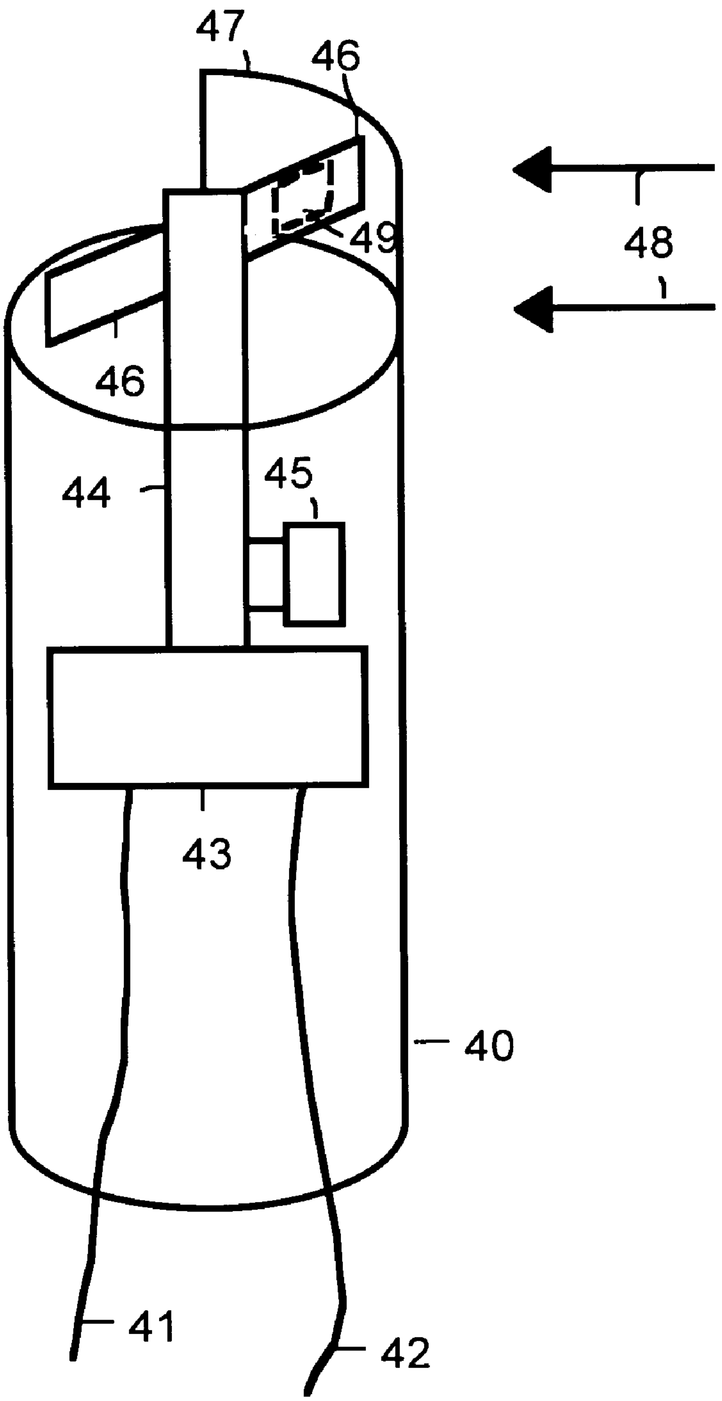
FIG. 2 is a simplified diagram showing a generator that scavenges power from fluid flow within a pipe in accordance with an embodiment of the present invention.

FIG. 2 is a simplified diagram showing implementation detail of a generator 40 used to scavenge power from fluid flow within a pipe in accordance with an embodiment of the present invention.

The construction of generator 40 can vary within various embodiments of the present invention. For example, a magnet 49 (instead of or in addition to magnet 45) can be directly attached to one of the legs of paddlewheel 46. Provided paddlewheel 46 is close enough to coil 43, sufficient current generation will result. Alternatively, one of the legs of paddlewheel 46 can be magnetized. In other embodiments of the present invention, for example, a rectifier can be added so that a direct current (DC) signal is produced by generator 40.The construction of generator 40 can vary within various embodiments of the present invention. For example, magnet 45 can be directly attached to one of the legs of paddlewheel 46. Provided paddlewheel 46 is close enough to coil 43, sufficient current generation will result. Alternatively, one of the legs of paddlewheel 46 can be magnetized. In other embodiments of the present invention, for example, a rectifier can be added so that a direct current (DC) signal is produced by generator 40.

Figure 3:
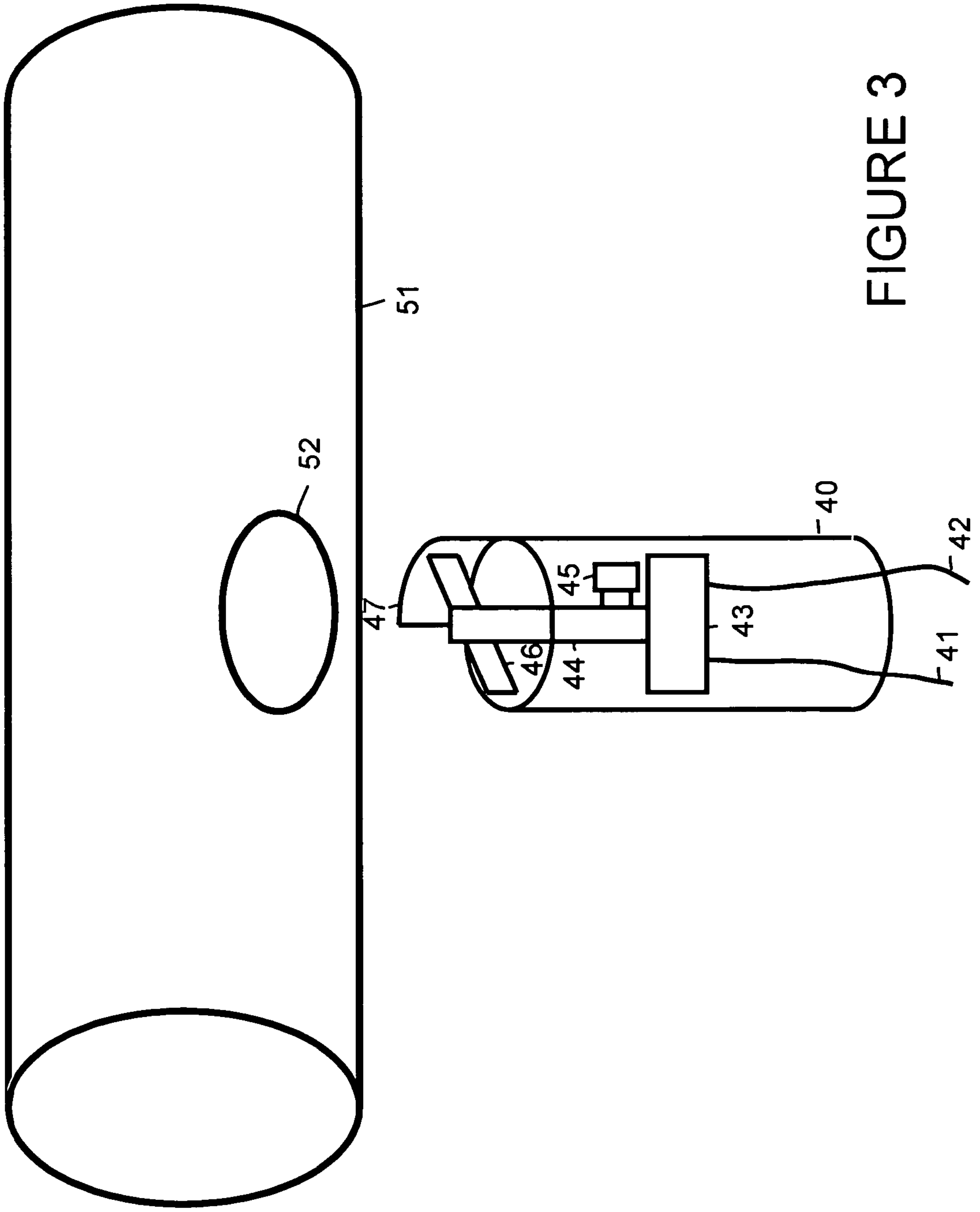
FIG. 3 is a simplified diagram showing a generator about to be attached to a pipe in accordance with an embodiment of the present invention.

FIG. 3 is a simplified diagram showing generator 40 about to be attached to a pipe 52. A hole 52 has been drilled in pipe 51. The diameter of hole 52 is sized to allow generator 40 to be fit snugly within hole 52. For example, both hole 52 and generator 40 are threaded to prevent leaks. This allows for insertion and sealing by rotation of generator 40 within hole 52. Alternatively, a leak preventing clamp is used to secure generator 40 to hole 52 and seal against leaks.

Figure 4:
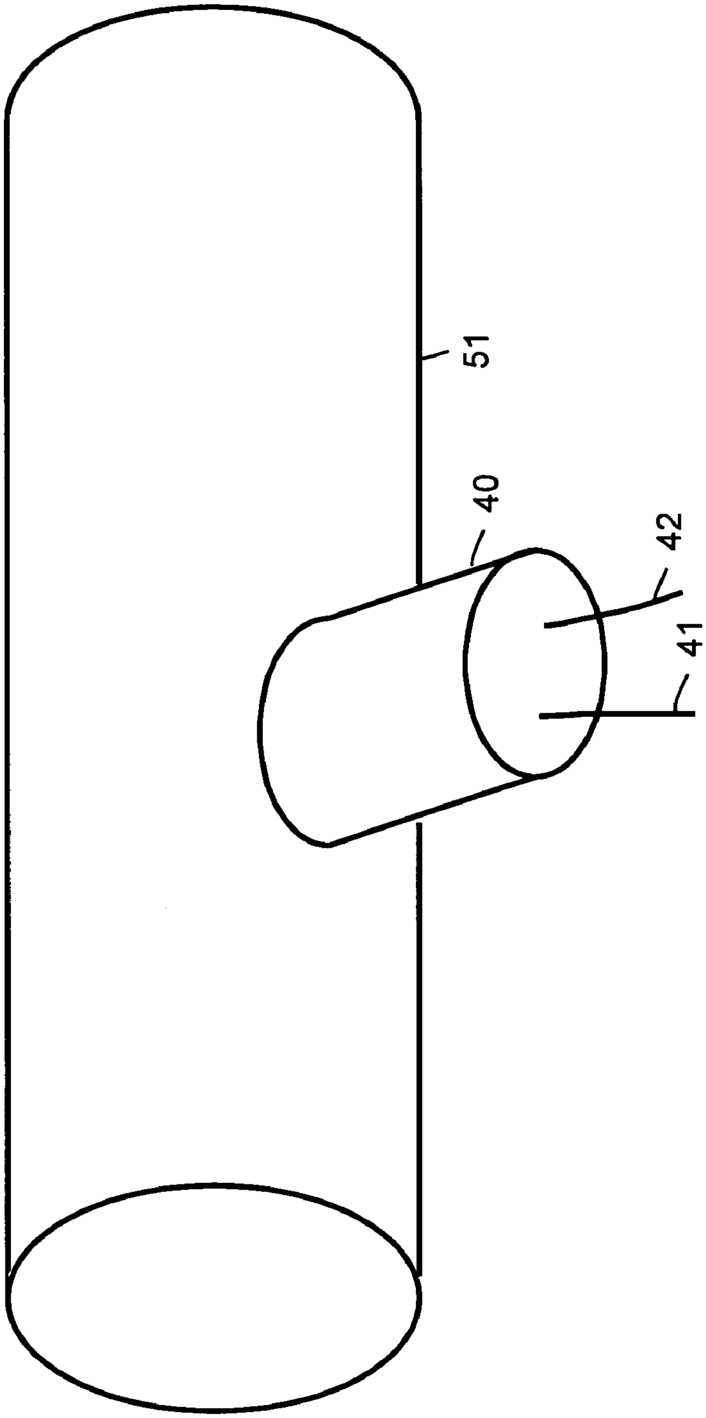
FIG. 4 is a simplified diagram showing a generator attached to a pipe in accordance with an embodiment of the present invention.

FIG. 4 shows generator 40 securely attached to pipe 51.

Figure 5:
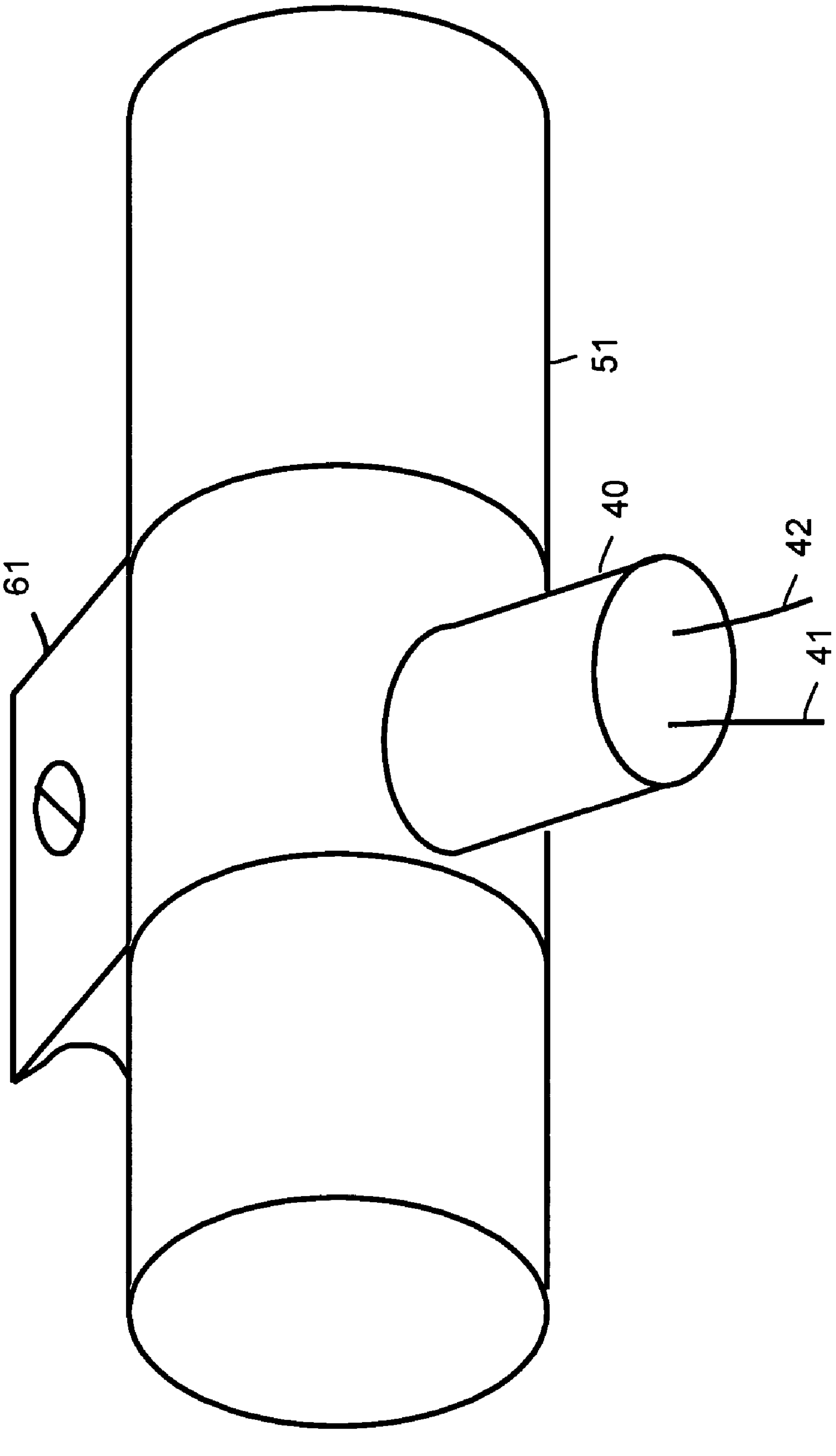
FIG. 5 is a simplified diagram showing a bracket that secures a generator to a pipe in accordance with an embodiment of the present invention.

FIG. 5 shows generator 40 securely attached to pipe 51. A clamp 61 has been added to assure the attachment of generator 40 to pipe 51 is sealed against leaks.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for retrofitting a pipe in order to supply power to a device, the method comprising:

forming a hole in the pipe;

placing a generator in the hole within the pipe so that a paddle wheel of the generator is rotated by fluid flow within the pipe;

rotating a magnet with the paddle wheel; and detecting the magnetic field with a coil located in close proximity to the magnet so as to produce an alternating current signal.

2. A method as in claim 1 wherein the magnet is attached to a shaft within the generator.

3. A method as in claim 1 wherein the magnet is located on a leg of the paddle wheel.

4. A method as in claim 1 wherein the magnet is implemented as a magnetized leg of the paddle wheel.

5. A method as in claim 1 wherein the device includes an imager that images a flame of an appliance.

6. A method as in claim 1 wherein the device includes a moisture detector.

7. A method as in claim 1 wherein the device includes a thermometer.

8. A method as in claim 1 wherein the device measures fluid flow within pipe.

9. A method as in claim 1 wherein the fluid is one of the following:

gas;

liquid.

10. A method as in claim 1 wherein the generator is placed in the hole so that part of the generator is on one side of the hole and within the pipe and part of the generator is on another side of the hole and outside the pipe.

11. A method for supplying power to a device, the method comprising:

retrofitting a pipe so that power is scavenged from fluid flowing in the pipe, including the following:

forming a hole in the pipe;

placing a generator in the hole within the pipe, the generator utilizing fluid flow in the pipe to produce a current.

12. A method as in claim 11 wherein the device includes an imager that images a flame of an appliance.

13. A method as in claim 11 wherein the device includes a moisture detector.

14. A method as in claim 11 wherein the device includes a thermometer.

15. A method as in claim 11 wherein the device measures fluid flow within pipe.

16. A method as in claim 11 wherein the generator is placed in the hole so that part of the generator is on one side of the hole and within the pipe and part of the generator is on another side of the hole and outside the pipe.

17. A method as in claim 11 wherein the fluid flow rotates a paddle wheel of the generator, a magnet being rotated with the paddle wheel so that a magnetic field is created within a coil located in close proximity to the magnet, the magnetic field producing an alternating current signal.

18. A method as in claim 17 wherein the magnet is attached to a shaft within the generator.

19. A method as in claim 17 wherein the magnet is located on a leg of the paddle wheel.

20. A method as in claim 17 wherein the magnet is implemented as a magnetized leg of the paddle wheel.

* * * * *